US010953985B2

(12) United States Patent
Hackert et al.

(10) Patent No.: US 10,953,985 B2
(45) Date of Patent: Mar. 23, 2021

(54) SYSTEM FOR MEASURING THREE-DIMENSIONAL ENVIRONMENT DATA, PARTICULARLY FOR PLANT CARE, AS WELL AS SENSOR MODULE

(71) Applicant: Vorwerk & Co. Interholding GmbH, Wuppertal (DE)

(72) Inventors: Georg Hackert, Bochum (DE); Martin Helmich, Duisburg (DE); Lorenz Hillen, Wuppertal (DE); Christian Holz, Dortmund (DE); Gerhard Isenberg, Cologne (DE); Hendrik Koetz, Wetter (DE); Andrej Mosebach, Bochum (DE); Roman Ortmann, Duisburg (DE); Robin Dulinski, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 126 days.

(21) Appl. No.: 16/042,437

(22) Filed: Jul. 23, 2018

(65) Prior Publication Data
US 2019/0023396 A1  Jan. 24, 2019

(30) Foreign Application Priority Data

Jul. 24, 2017   (DE) ...................... 10 2017 116 661.0

(51) Int. Cl.
*A01G 7/06* (2006.01)
*B64C 39/02* (2006.01)
(Continued)

(52) U.S. Cl.
CPC .......... *B64C 39/024* (2013.01); *A01B 79/005* (2013.01); *A01G 7/06* (2013.01);
(Continued)

(58) Field of Classification Search
CPC .. A01B 79/005; A01G 7/06; B64C 2201/123; B64C 2201/126; B64C 39/024
See application file for complete search history.

(56) References Cited

U.S. PATENT DOCUMENTS 8,295,979 B2 * 10/2012 Thacher ................. A01G 25/00
                                                  700/250
8,321,365 B2 * 11/2012 Anderson ................ G06N 5/02
                                                  706/46

(Continued)

FOREIGN PATENT DOCUMENTS

DE   10 2015 111 392 A1   1/2017
EP        2 423 893 B1    4/2013

OTHER PUBLICATIONS

"The National Gardening Association: Gardening Discussion Forums"; <garden.org/forums/> (Year: 2016).*

*Primary Examiner* — Anshul Sood
(74) *Attorney, Agent, or Firm* — Collard & Roe, P.C.

(57) ABSTRACT

A sensor module is assigned to a vehicle that can be displaced in a terrain or designed for being positioned in the terrain. The sensor module has a sensor system with sensors that acquire sensor data in a contactless fashion. The sensors are designed for detecting the spatial extent of the plant at a location in the terrain. The sensor data makes it possible to determine whether the plant should be pruned. To this end, the sensor data is evaluated by utilizing a knowledge database.

5 Claims, 2 Drawing Sheets

(51) Int. Cl.
 *A01B 79/00* (2006.01)
 *A01B 69/04* (2006.01)

(52) U.S. Cl.
 CPC ....... *A01B 69/008* (2013.01); *B64C 2201/123* (2013.01); *B64C 2201/126* (2013.01); *B64C 2201/145* (2013.01)

(56) References Cited

U.S. PATENT DOCUMENTS

| | | | |
|---|---|---|---|
| 9,251,698 B2* | 2/2016 | Vian | G08B 17/005 |
| 10,058,997 B1 | 8/2018 | Chao | |
| 10,241,097 B2* | 3/2019 | Miresmailli | A01G 7/00 |
| 2002/0156556 A1 | 10/2002 | Ruffner | |
| 2004/0264761 A1* | 12/2004 | Mas | G06K 9/00664 |
| | | | 382/154 |
| 2006/0213167 A1* | 9/2006 | Koselka | A01D 46/30 |
| | | | 56/10.2 A |
| 2012/0127017 A1 | 5/2012 | Sasabuchi | |
| 2012/0239191 A1 | 9/2012 | Versteeg et al. | |
| 2013/0116825 A1 | 5/2013 | Kim et al. | |
| 2014/0303814 A1* | 10/2014 | Burema | B64D 1/16 |
| | | | 701/3 |
| 2015/0163993 A1* | 6/2015 | Pettersson | A01D 34/008 |
| | | | 701/28 |
| 2015/0367513 A1 | 12/2015 | Gettings et al. | |
| 2016/0278599 A1 | 9/2016 | Seo et al. | |
| 2016/0292905 A1 | 10/2016 | Nehmadi et al. | |
| 2017/0020087 A1 | 1/2017 | Younis et al. | |
| 2017/0225336 A1 | 8/2017 | Deyle et al. | |

* cited by examiner

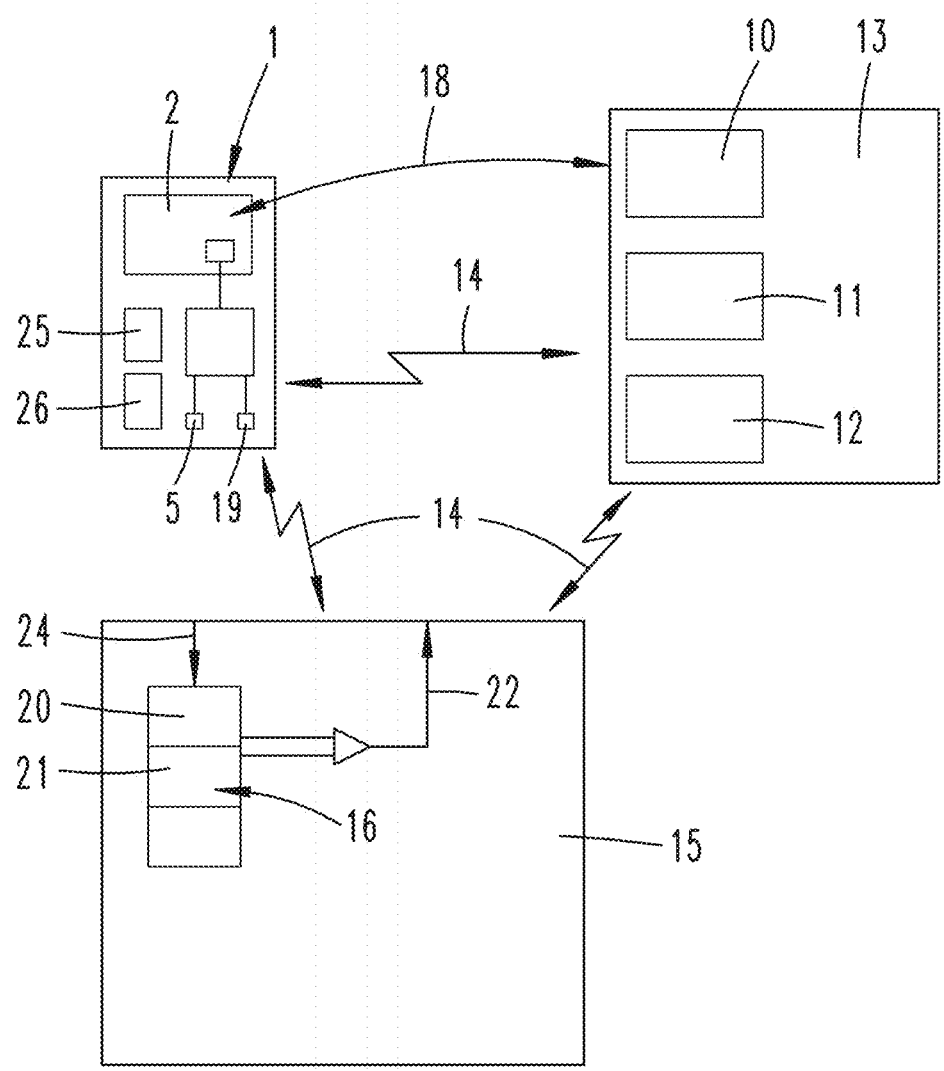

SYSTEM FOR MEASURING THREE-DIMENSIONAL ENVIRONMENT DATA, PARTICULARLY FOR PLANT CARE, AS WELL AS SENSOR MODULE

CROSS REFERENCE TO RELATED APPLICATIONS

Applicant claims priority under 35 U.S.C. § 119 of German Application No. 10 2017 116 661.0 filed Jul. 24, 2017, the disclosure of which is incorporated by reference.

BACKGROUND OF THE INVENTION

1. Field of the Invention

The invention pertains to an apparatus and a method for determining an actual state of plants with a sensor module, which is assigned to a vehicle that can be displaced in a terrain or positioned in the terrain and comprises a sensor system with sensors that acquire sensor data in a contactless fashion. The apparatus is particularly formed by a sensor module, which is assigned to a vehicle that can be displaced in the terrain or freely positioned in the terrain.

The invention furthermore pertains to a system consisting of a vehicle that can be automatically displaced in an outdoor area with the aid of a running gear, which is controlled by a control unit based on sensor data acquired by a first sensor system and, if applicable, a map stored in a memory element, wherein physical characteristics of objects in the environment can be detected with the sensor system.

The invention furthermore pertains to a method for operating a vehicle that can be automatically displaced in an outdoor area with the aid of a running gear, which is controlled by a control unit based on sensor data acquired by a first sensor system and, if applicable, a map stored in a memory element, wherein said vehicle features tools.

2. Description of the Related Art

Such working apparatuses are known from the prior art, e.g. in the form of self-traveling lawnmowers. EP 2 423 893 B1 discloses a sweeping robot that can be displaced in an indoor area and features cleaning tools.

SUMMARY OF THE INVENTION

The invention is based on the objective of disclosing measures for automated plant care.

It is initially proposed that environment data is acquired with a sensor module, which can be assigned to a vehicle that can be displaced in a terrain, but also freely positioned in the terrain, and comprises a sensor system with sensors that acquire sensor data in a contactless fashion. The sensors are designed for detecting the spatial extent of a plant at a location of the plant, which is recorded, e.g., in a two-dimensional map. The data acquired by the sensors, e.g. image data, is used by an image-processing computer unit for generating a volume model of the plant at its location. The method determines the actual state of a plant or the actual states of multiple plants. The sensor data, which provides a three-dimensional image of the environment, supplements the two-dimensional location coordinates of the plants with height and/or volume data. The computer unit can determine current growth height data of the plants from this height and volume data. It is furthermore proposed that the current growth height data is compared with older growth height data, which was previously acquired with the same method and the same sensor module. A knowledge database containing information on the time of year, at which certain plant care tasks such as pruning tasks can be carried out, may be used for outputting recommended plant care actions. To this end, a volume increase of the plant is determined by comparing the current growth height data with the older growth height data. Based on the knowledge database, it is then determined if the volume increase necessitates pruning. In an enhancement of the invention, these recommended actions are used for controlling the operation of a plant care robot that can be automatically displaced in the terrain. It is furthermore proposed that the knowledge database is permanently maintained by a user group and made available in a decentralized fashion, e.g. accessible via the Internet.

The invention also pertains to a plant care system, in which two sensor modules are used for acquiring height and/or volume data. It is particularly proposed that a first and a second sensor system are designed for detecting physical characteristics of the same object, particularly the same plant, from different angles. The physical characteristics preferably concern information on the spatial extent of the plants. The height and/or volume data can be determined from this information. An inventive sensor module may be a self-traveling land vehicle or a self-traveling air vehicle. The vehicle is particularly GPS-controlled. The air vehicle can be automatically positioned at different locations in the airspace in order to record images of the object, particularly of the plant, from these locations. According to an enhancement of the sensor module, it is proposed that the sensors comprise at least one imaging sensor, a sensor for detecting a soil temperature and/or an air temperature, a sensor for detecting the atmospheric moisture and/or the soil moisture, a sensor for detecting UV rays and/or a brightness sensor. It is furthermore proposed that the sensor module or the vehicle carrying the sensor module communicates with a base station or an external computer unit via data transmission means. The external computer unit may comprise the knowledge database. The external computer unit may also be provided with means that utilize the images of a spatial structure, which were recorded by the sensors at different locations, for calculating a three-dimensional model of the three-dimensional structure. It is furthermore proposed that the vehicle can be selectively equipped with a sensor module or a working module, wherein the working module carries module-specific plant care tools. The vehicle carries the sensor module in an environment data acquisition mode. In a working mode, the vehicle carries the working module. When multiple vehicles or a vehicle and a stationary sensor module are used, the working module can be motion-controlled with the sensor data acquired by the sensor module. To this end, it is particularly proposed that the first sensor system and the second sensor system detect physical characteristics of the same object, particularly the same plant to be cared for, from different angles.

BRIEF DESCRIPTION OF THE DRAWINGS

The invention is described in greater detail below with reference to the attached drawings. In these drawings.

DETAILED DESCRIPTION OF THE PREFERRED EMBODIMENTS

Figure 1:
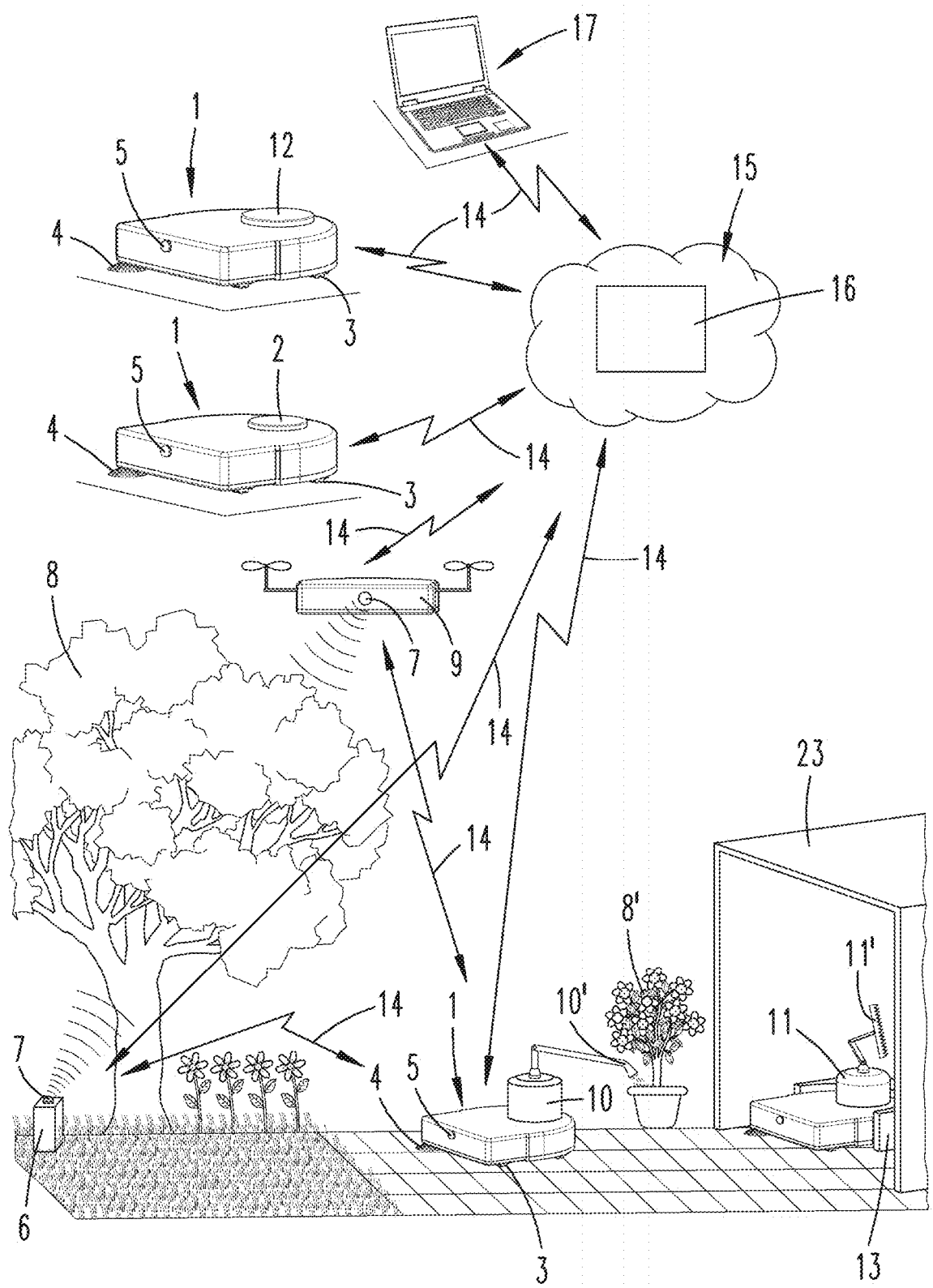
FIG. 1 shows a terrain featuring plants 8, 8', a working apparatus 1 for plant care, a sensor module 9 for acquiring environment data and an external computer unit 15 for the communication 14 with a plurality of working apparatuses 1 and/or data communication devices 17, and FIG. 2 schematically shows a working apparatus 1, a base station 13 and the communication paths for communicating with an external computer unit 15.

The invention concerns garden care apparatuses and methods, as well as a corresponding garden care system. The essential system components are at least one working apparatus 1, one or more working modules 10, 11 and an external computer unit 15, which can communicate with the working apparatus 1 via data transmission means 14 that may be realized in the form of a home network or the Internet.

The working apparatus 1 has a housing and features a running gear 3 that is arranged within the housing and may comprise wheels, track drives or even one or more airscrews, by means of which the working apparatus 1 can travel in an outdoor area, outside of buildings or in a garden, if applicable also in an airborne fashion. It features a control unit 12, which may be realized in the form of a microcontroller or another program-controlled computer unit with a peripheral memory.

Sensors 5 are provided and enable the control unit 12 to acquire structural data on the environment, e.g. the shape and the size of objects such as buildings and plants, but also persons and animals. This data initially serves for the navigation of the working apparatus 1 in the terrain. A map of the terrain may furthermore be stored in the storage elements of the control unit 12 and contain lawn surfaces, crop plant or ornamental plant beds, trees, paths or other permanent structural data of the environment, based on which the working apparatus 1 can automatically navigate in the environment. The sensors 5 furthermore comprise sensors for detecting status data on the environment that changes over the course of time, particularly status data on the plants. For example, an image of the plants can be acquired with a camera. The atmospheric moisture or the soil moisture can be detected with a moisture sensor. A UV sensor makes it possible to detect the current UV irradiation. The soil temperature and/or the air temperature can be measured with a thermometer. A brightness sensor can detect the current brightness. It is particularly proposed to generate a three-dimensional map, wherein this map contains the location and the height of individual plants, individual plant groups, buildings or other objects. The three-dimensional map particularly also contains the type of plants and zones, in which a land vehicle is not allowed to travel. The map may furthermore contain storage spaces for working apparatuses such as vehicles and working modules or sensor modules. The three-dimensional map may be generated based on a two-dimensional map, wherein the two-dimensional map was generated by a user with measuring means or with images. The sensors 5 make it possible to acquire environment data for supplementing the 2D map.

A transmitting/receiving unit 19 is provided for realizing wireless communication, particularly via the data transmission means 14. The transmitting/receiving unit 19 may directly communicate with a base station 13 that is stationarily arranged in the terrain and the position of which is recorded in the map of the working apparatus 1. However, the data transmission means 14 may also be realized in such a way that the working apparatus 1 can directly communicate with a home network or the Internet.

The working apparatus 1 furthermore comprises an accumulator 25 that can be charged while the working apparatus 1 is docked to the base station 13 and otherwise supplies the working apparatus 1 with electrical energy.

The working apparatus 1 features a device for accommodating working modules 10, 11 that carry module-specific tools 10', 11'. This device is referred to as module carrier 2 below and designed in such a way that the working apparatus 1 can automatically exchange a working module 10 with another working module 11. This preferably takes place at the base station 13 or in the region of a storage facility, e.g. a shed 23, in which the working modules 10, 11, are stored in a weatherproof fashion. Means that are not illustrated in the drawings and realized, e.g., in the form of grippers or the like may be provided at this location in order to fix the working modules 10, 11 on the module carrier 2. The module carrier may feature a module interface 18, by means of which a signal connection and a power connection with the working module 10 can be produced.

The module carrier 2 features a not-shown mechanical interface and a not-shown electrical interface. The working modules 10, 11 or, if applicable, the sensor modules likewise feature a mechanical interface and an electrical interface. The two mechanical interfaces interact with one another in such a way that they mechanically fix the working module 10 or the sensor module on the module carrier 2. This may be realized with hooks, screw connections or other snap-type connections that can be transferred from a fixing position into a release position. The electrical interface makes it possible to transfer electrical energy from the working appliance 1 to the working module 10, 11. However, it is also possible to transfer electrical energy from the working module 10, 11 to the working apparatus 1. It is furthermore proposed that a data exchange between the working apparatus 1 and the working module 10, 11 takes place via the electrical interface. The electrical interface may be realized in the form of a plug-type connection. To this end, the plug and the mating plug engage into one another in order to be electrically contacted with one another.

The drawings merely show an exemplary working module 10 in the form of an irrigation module that features an irrigation tool 10'. The irrigation module 10 may comprise a tank for storing water, which can be filled at the base station 13. However, the irrigation module 10 may also be connected to a hose in order to receive water from a faucet.

The reference symbol 11 identifies a cutting module that features cutting tools 11' for pruning plants. The cutting tool 11' may be realized, e.g., in the form of shears or a mowing mechanism. It may particularly be realized in the form of hedge trimmers or pruning shears, by means of which hedges, trees or other plant growth can be pruned. Working modules with special tools for spreading fertilizer, raking leaves, clearing snow or tilling soil are furthermore provided.

It is furthermore possible to provide sensor modules 6 that are either stationarily arranged in the terrain or positioned at a suitable location in the terrain for performing the respective task by the working apparatus 1. However, the sensor module 6 may also be realized in a self-traveling fashion and automatically navigate to a location. To this end, for example, a working apparatus 1 may carry a sensor module instead of a working module 10, 11.

According to a variation, it is proposed that the sensor module 9 is a flying sensor robot. A GPS control or the like enables this drone, which features one or more airscrews, to assume predefined positions in the airspace above the terrain in order to acquire status data in different positions.

It is preferred that the sensors 5, 7 of the working apparatus 1 and the sensor module 6, 9 are realized in the form of imaging sensors such as a camera, by means of which two-dimensional images can be recorded. The control unit 12 or the external computer unit 15 can calculate three-dimensional structural data on the environment from these two-dimensional images. The sensors 5, 7 furthermore comprise temperature sensors for detecting the soil temperature and/or the air temperature, moisture sensors for detecting the soil moisture and/or the atmospheric moisture, UV sensors or brightness sensors. It is proposed that the working apparatus 1 and/or the sensor module 6, 9 features at least one of these sensors, but preferably a plurality of such sensors.

The sensor data acquired by these sensors 5, 7 optionally is wirelessly transmitted to an external computer unit 15 with the aid of the data transmission means 14.

According to an aspect of the invention, the external computer unit 15 is operated distantly, particularly by an external server. However, it may also be formed by a local computer. The external computer unit 15 can communicate with a plurality of working apparatuses 1 that are operated at different locations. The external computer unit 15 is furthermore capable of communicating with one or more data communication devices 17 standing by at different locations, namely data communication devices 17 in the form of mobile terminals, personal computers, tablet computers or the like. A plurality of users and particularly members of a user group can input empirical values and data on specific terrain areas to be cared for by means of these data communication devices 17. Cartographies can thereby also be transmitted, wherein the cartographies are recorded during exploratory drives of the working apparatus 1. In addition, information on the positions and the type of certain plants in the respective terrain can also be input by means of the data communication devices 17.

The external computer unit 15 comprises a database 16, in which care information for plants is stored. The care information particularly contains plant-specific care information such as information on the times of year, at which the plants should optimally be pruned, information on whether the plants shed leaves, information on which soil moistures are optimal for the plants or the like. The care information therefore particularly contains irrigating information, pruning information and cleaning information. Location-specific data, which is user-specific and particularly contains the map of the terrain to be cared for, is furthermore stored in the database 16. The location-specific data may also comprise the location data on the plants, information on existing working modules 10, 11, current weather information and plant heights. Legal requirements may likewise be stored in the database.

The current weather information, plant heights, soil moisture and atmospheric moisture, etc., are acquired by the sensors 5, 7 of the working apparatus 1 or the sensor modules 6, 9, respectively. This status data 24 is made available to the external computer unit 15 via the data transmission means 14 and stored therein.

The computer unit 15 is capable of calculating task data 22 based on the care data, i.e. the location-specific data 20 and the care information 21, particularly with consideration of the current status data 24. This task data 22 contains tasks to be currently performed in the terrain in order to care for plants. For example, the task data 22 may contain information on the location, at which plant irrigation has to be carried out, or information on which plant has to be trimmed at which location. Furthermore, the task data may contain information on whether a lawn area has to be mowed or if an area has to be cleared of leaves. To this end, growth height data is calculated from the height and volume data.

In addition to the acquisition of the status data 24 with the sensors of the working apparatus 1 or the sensor modules 6, 9, an autarkic task completion in the terrain can also be realized by utilizing these sensors 5, 7. To this end, the sensor modules 6, 9 are moved into an optimal position for acquiring the structural data, e.g. in order to produce a 3D image of the plant to be cared for with its cameras. The tools 10', 11' of the working modules 10, 11 are then controlled based on this structural data.

Furthermore, the external computer unit 15 may also contain a knowledge database, into which users can input their personal experiences or by means of which users can pose questions to members of the user groups. The external computer unit 15 therefore makes available a communication platform that is realized similar to a social media platform and can serve as a meeting place for users of such an autonomous outdoor appliance. This platform and, in particular, applications associated with this platform can process empirical values of individual users for the entirety of all users and make the results available to the community, e.g. in the form of tips, user suggestions or user aids. The user communicates with this communication platform, e.g., by means of a control device such as a control device of the autonomous outdoor appliance. Communication by means of a mobile terminal, a tablet PC and, in particular, via an Internet connection is also possible. It is furthermore proposed that the autonomous working apparatus 1 or one of the sensor modules 6, 9 features a touch-sensitive screen, by means of which the communication with the external computer unit 15 can be realized.

The knowledge database can also be used for outputting recommended actions, by means of which the growth of individual plants can be optimized, depending on tips or empirical data stored in the database by the user.

LIST OF REFERENCE SYMBOLS

1 Working apparatus
2 Module carrier
3 Running gear
4 Sweeping mechanism
5 Sensor
6 Sensor module
7 Sensor
8 Plant
8' Plant
9 Drone
10 Working module
10' Tool
11 Working module
11' Tool
12 Control unit
13 Base station
14 Data transmission means
15 Computer unit
16 Database
17 Data communication device
18 Module interface
19 Transmitting/receiving unit
20 Data
21 Care information
22 Task data
23 Shed
24 Status data
25 Accumulator
26 Communication interface

What is claimed is:

1. A system comprising:
   a vehicle that can be automatically displaced in an outdoor area and comprises a running gear;

a control unit that controls the running gear, a working module with module-specific plant care tools, a first sensor system having sensors that detect physical characteristics of objects in the environment, the sensors acquiring control data that is used by the control unit along with a map stored in a memory element, and a second sensor system that comprises sensors assigned to a sensor module, wherein the first sensor system and the second sensor system are configured so that they detect physical characteristics of the same object from different angles, a computer unit, a data transmitter configured for communicating with an external computer unit providing a knowledge data base maintained by a user group, the external computer unit being available in a decentralized manner accessible via the internet, wherein the external computer unit provides a platform capable of processing empirical values of individual users for an entirety of all users and providing results to a community in a form of user suggestions or user aids, wherein the sensors of the first and second sensor systems comprise at least one of the following sensors: a sensor for detecting atmospheric moisture, a sensor for detecting UV rays or a brightness sensor, wherein the second sensor system is configured to be displaced by the vehicle and comprises sensors that acquire sensor data in a contactless fashion, wherein the sensors are designed for detecting a spatial extent of a plant at a location of the plant, wherein the computer unit is capable of supplementing the map, which contains two-dimensional location coordinates of plants, with height and/or volume data of the plants by utilizing the sensor data, and determining current growth height data of the plants from the height and/or volume data, wherein the computer unit is further configured to compare the current growth height data with older growth height data, which was previously acquired with the same method and same sensor module in order to determine a volume increase of the plants, wherein the computer unit is configured to determine, based on the knowledge data base, if the volume increase necessitates a plant care action of the working module, wherein the vehicle is configured to carry the sensor module in an environment data acquisition mode configured for acquiring the height and/or volume data of the plants, and is configured to carry the working module instead of the sensor module in a working mode, wherein the plant care tools of the working module are motion-controlled with sensor data acquired by the sensor module, and wherein the computer unit is configured to automatically control the determined necessary plant care action of the working module.

2. The system according to claim 1, wherein the vehicle is an air vehicle that is configured to be positioned in an airspace in a GPS-controlled fashion.

3. The system according to claim 1, further comprising a device configured for calculating a three-dimensional model of a three-dimensional structure from images of a spatial structure that were recorded by the sensors at different locations.

4. A method for operating a system according to claim 1 comprising:

detecting physical characteristics of a plant to be cared for with the first sensor system and the second sensor system from different angles.

5. The method according to claim 4, further comprising controlling one of the tools by utilizing sensor data acquired by the first sensor system and the second sensor system.

* * * * *